Patented Nov. 15, 1938

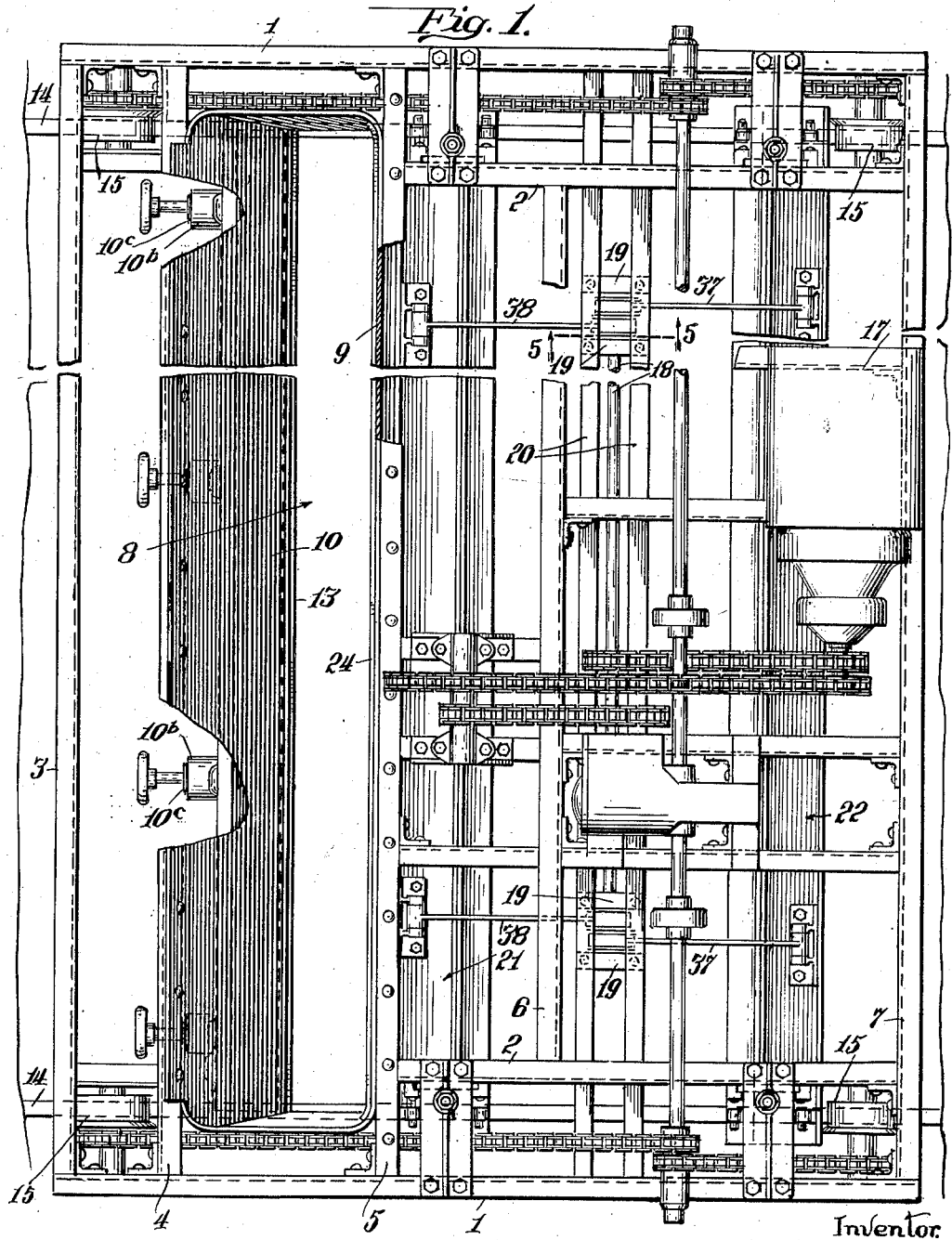

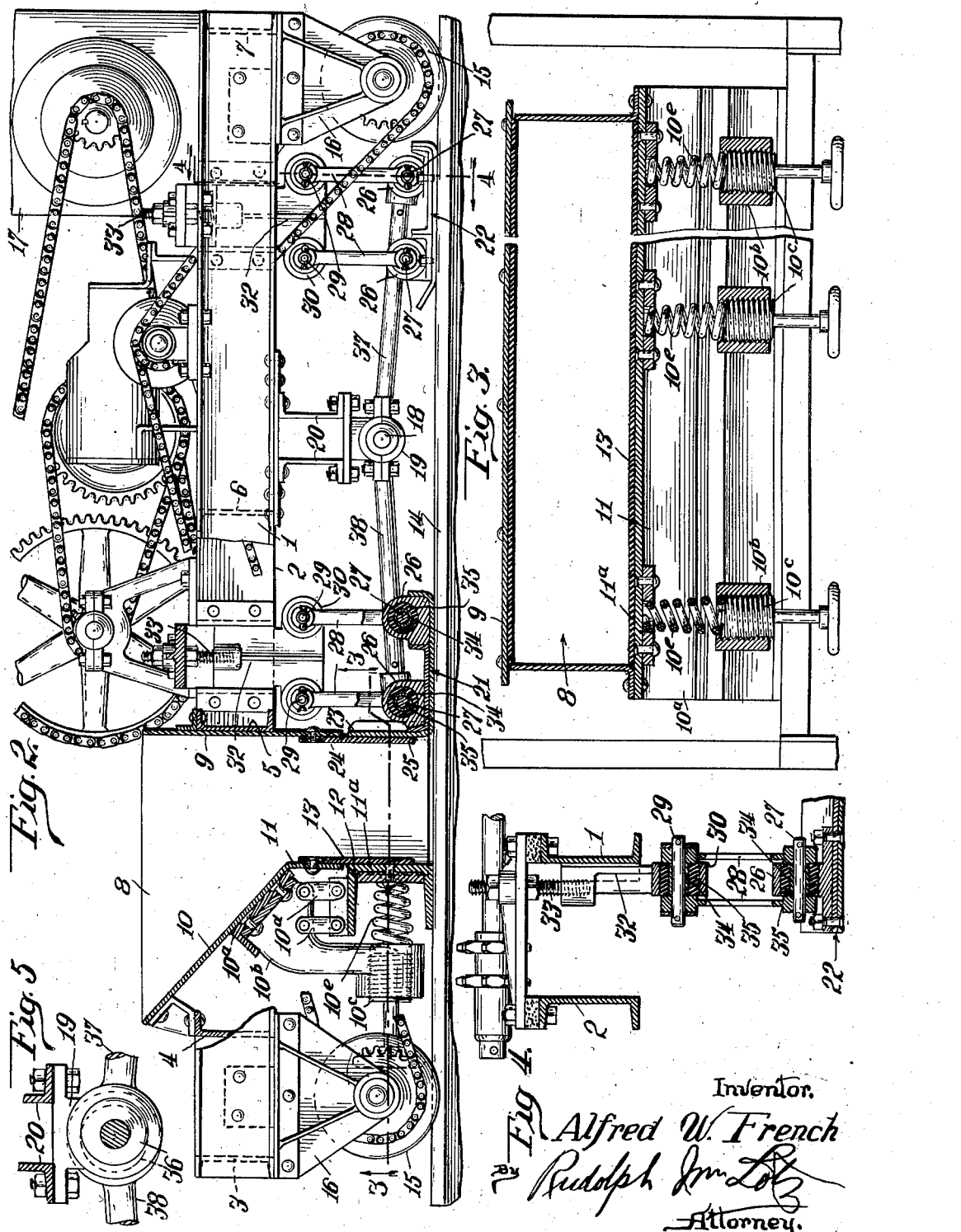

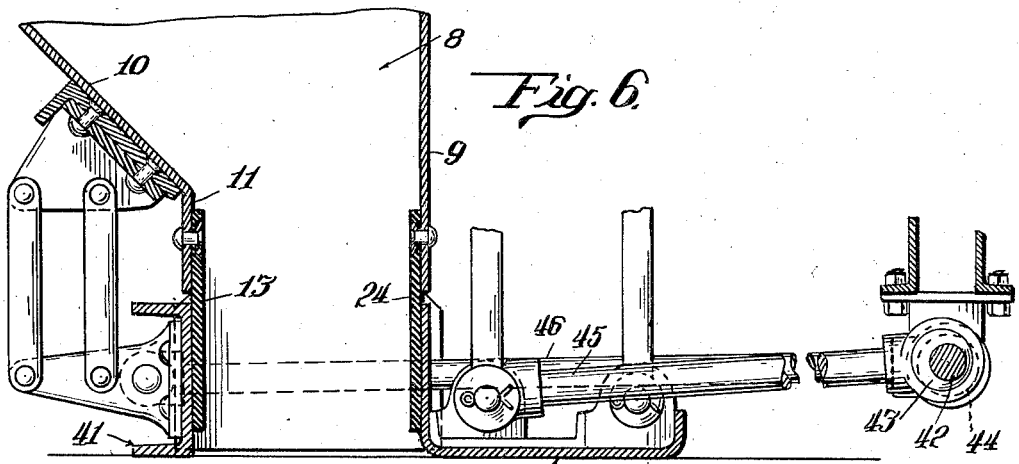
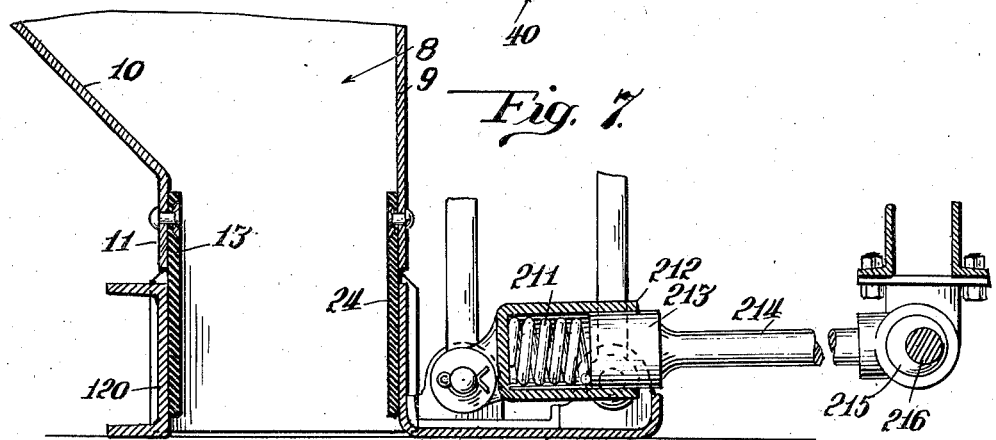
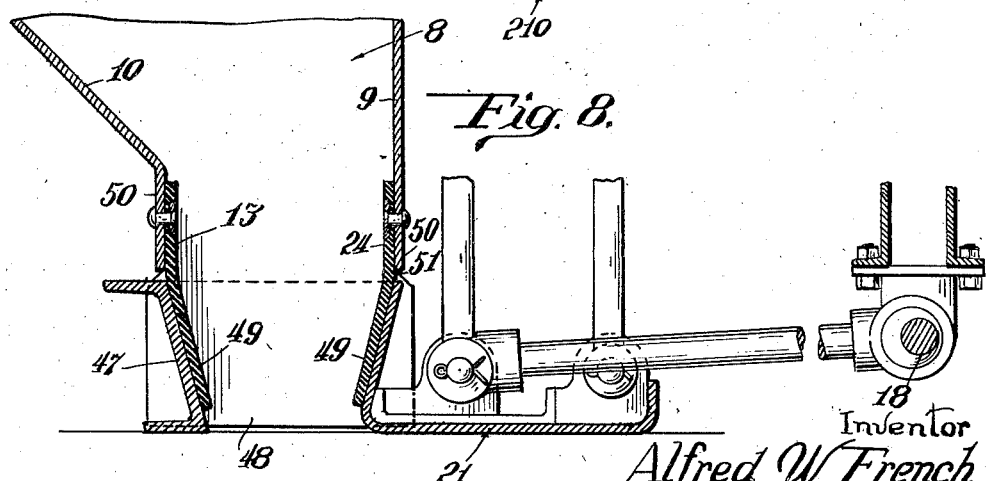

2,136,917

UNITED STATES PATENT OFFICE 2,136,917

MACHINE FOR TREATING CONCRETE MIX AND LAYING AND SURFACING THE SAME

Alfred W. French, Chicago, Ill.

Application November 21, 1935, Serial No. 50,858

8 Claims. (Cl. 94—46)

In the art of concrete construction, as practiced in connection with highway paving, wall construction, and the like, it is and has been customary for many years to employ mixes consisting of graded coarse and fine non-cementitious solid aggregates admixed with cement and water, wherein the water-cement ratio is such as to produce what is commonly known as a "wet" mix. The latter is delivered from the mixing machines in easily workable, plastic condition, its plasticity being determined by what is known as the "slump" test which is familiar to persons skilled in the art and requires no explanation herein.

Generally speaking, concrete having a slump of from one to two inches has been used almost universally, but attempts have been made to use mixes having less than one inch slump. These attempts have met with only partial success because of the relatively unworkable condition of the mix and the long time and amount of labor required to render it workable and in proper condition to produce the desired ultimate product.

It is a matter of common knowledge among those skilled in the art that a concrete mix having a slump of about one-half inch maximum to no slump, has never been produced commercially heretofore though it has been well-known that concrete containing the small water-cement ratio which will impart to it the no slump characteristic, would be ideal in strength and density for practically all construction purposes. The water ratio of a mix determines its slump and is generally far in excess of the amount required for chemical combination with the cement. An excess of cement content of a mix is rendered necessary by the excess of water, on the one hand, and by lack of efficient close packing of non-cementitious solids of the mix to avoid thick courses of cement mortar between opposed surfaces of the coarser aggregates and in numerous large pockets in the mass.

An excessive water-ratio of a mix required displacement and evaporation of the excess water from the mass. The displacement of water causes an appreciable amount of cement to be carried with it to the surface and evaporation of the remainder of the excess water produces voids in the mortar content which renders the latter spongy and thus produces an ultimate product lacking in the full strength that it should possess and which also lacks the degree of density that renders the ultimate product substantially water proof.

The entry of water into the mortar courses of concrete and the freezing thereof in cold weather is probably the most destructive factor that determines the life of a concrete structure exposed to rain and frost.

The factor that determines mainly the minimum cement ratio of a mix is the average size of the component non-cementitious solid aggregates of the mix, the cement ratio being greater as the said average size is decreased because of the greater aggregate surface area to be covered by the cement mortar of the mass.

The factors that determine the minimum water ratio of the mix are— a. The amount of moisture contained in the non-cementitious solids.

b. Porosity of said solids.

c. Atmospheric conditions as to temperatures and humidity.

d. The cement ratio of the mix.

In every mix the water-cement ratio must include a sufficient excess over the minimum requirements pointed out above to provide a superficial film of cement mortar upon a deposited mass of mix for surface finishing purposes in the case of pavements and for building together successive courses of concrete in a building foundation or a wall of any kind.

The mixes used are, in the main, of from one to two inches slump type which are fluent and easily workable. When deposited the mix is full of air bubbles which, in the vernacular of art, are termed "voids".

The complete elimination of all voids in the ultimate product and a uniform distribution of the mortar content thereof throughout the mass would, obviously, produce the highest grade of finished product and it is the main object of the present invention to provide a machine that will produce a finished product of that type or a very close approach thereto at less cost for cement and labor than has been accomplished heretofore.

Another essential object of the invention is to provide a machine for producing a concrete mix devoid of voids and of the no-slump type or a very close approach thereto, laying said mix directly after its production in such a manner as will prevent air from being trapped therein, and thereafter surfacing the mix, these several operations constituting a continuous method.

A further object of the invention is to provide a machine accomplishing the foregoing objects which lends itself readily to the present practices in the plastic pavement construction art without necessitating any change therein, other than causing the concrete mixing machine or machines employed to discharge the mix into the hopper of the present machine and effecting elimination of all further surfacing operations than that of the final belting.

Reference is made to my pending applications for patents Serial Numbers 20,426 and 43,982, the latter covering a method of converting an unworkable concrete mix into a workable mass which the machine of this invention and that of said application No. 20,426 are designed to carry out with particular respect to highway pavement construction.

The instant machine embodies, more particularly, improvements in the mechanism for converting the unworkable concrete mix into a workable, dense mass, several different mechanisms capable of producing this result being illustrated in the accompanying drawings, wherein:

Fig. 1 is a plan view of a machine constructed in accordance with the invention.

Fig. 2 is a side elevation of the same, partly in vertical longitudinal section.

Fig. 3 is a fragmentary plan sectional view taken on the line 3—3 of Fig. 2.

Fig. 4 is a fragmentary detail vertical sectional view taken on the line 4—4 of Fig. 2.

Fig. 5 is a fragmentary detail vertical sectional view taken on the line 5—5 of Fig. 1.

Figs. 6, 7 and 8 are more or less diagrammatic, vertical, longitudinal, fragmentary, sectional views, showing various mechanisms for effecting treatment of concrete mixes which may be substituted, respectively, for the mechanism shown in Figs. 1, 2 and 3.

In said drawings, the machine is shown as consisting of a suitable rectangular frame composed of conventional steel beams, such as channel bars and I-beams, or the like, and which includes the side frame members 1 and 2, cross-frame members 3, 4, 5, 6 and 7 and additional connecting frame members which need not be specifically described.

Mounted upon said frame in the front end portion thereof is a hopper 8 having a vertical rear wall 9 and an inclined front wall 10, said walls being rigid with the side walls of said hopper which covers practically the entire width of the machine.

The spout or delivery end portion of the hopper comprises a vertical front wall portion 11 integral with the inclined wall 10 and which is parallel with the lower end portion of the rear wall 9.

Mounted upon the wall 10 is an angle bar 10a extending over the entire width of said wall for reinforcement thereof. A series of brackets 10b are mounted upon the said angle bar 10a and are equipped at their depending lower ends with threaded openings wherein threaded plugs 10c are engaged.

Disposed below the lower edge of the wall portion 11 is the web 11a of a channel bar 12 having horizontally disposed flanges extending forwardly from said web. Said channel bar constitutes what may be termed a screed which is slightly arcuate to conform to the predetermined profile of the crown of a pavement and which bridges the space between the side forms 14 bordering the pavement strip or grade.

The said channel bar 12 is suspended from the said brackets 10b by means of pairs of links 10d. Compression springs 10e are interposed between the plugs 10c and the web 11a of the channel bar for holding the latter normally in the position shown in Fig. 2.

An apron 13 composed of rubber belting or other suitable flexible material, is suspended from the wall portion 11 and overlaps the rear face of the web 11a of the channel bar or screed and bridges the slight gap between the latter and said wall portion 11.

The lower face of the lower flange of the channel bar 12 is maintained preferably very slightly higher than the predetermined profile or crown of the finished pavement for reasons set forth hereinafter.

The side walls of the hopper have the inner faces of their lower edge portions disposed, preferably, in vertical alignment with the inner faces of the side forms 14 and extend almost to the crowns of the latter. Said end walls also are equipped with front extension portions or wings 14a between which the ends of the channel bar 14 are snugly fitted. The rear edge portions of said side walls are opposed to the front wall of a screed 21, hereinafter described, which is reciprocable longitudinally of the side forms 14, suitable provision being made to prevent leakage from the hopper spout at the rear corners thereof as by means of the flexible apron hereinafter described.

The traction wheels 15 upon which the frame of the machine is supported by means of the customary truck 16, are suitably driven by means of gearing connecting the same with the engine 17. The latter is mounted between the side portions of the machine frame and is suitably geared to a shaft 18 journalled in bearings 19 which are mounted upon the lower faces of the cross frame members 20 which are secured to the lower flanges of the side frame members 1 and 3 and to intermediate frame members parallel therewith.

A particular description of the gearing connecting the said shaft 18 with the shaft of the engine 17 is omitted as being superfluous and capable of being selected by persons skilled in the art; that being true also of the gearing connecting the traction wheels 15 with the engine shaft. The said gearing connecting the engine shaft with shaft 18 is such as to drive the latter at high speed as, for example 1500 to 3000 R. P. M.

Disposed in front of and behind the shaft 18 are screeds 21 and 22, respectively, which span the entire width of the pavement strip and preferably overhang the crowns of the side forms 14. Each of said screeds comprises, in the main, a channel member set with its flanges extending upwardly, the front flange 23 of the front screed 21 extending to a height above the level of the lower edge of the rear wall 9 of the hopper and being disposed in close proximity to, but spaced from the latter. A flexible apron 24 of rubber or other suitable material is secured to the lower end portion of the front wall 9 of the hopper and extends over the entire length thereof and includes a depending free edge portion 25 which is disposed in front of the screed 21 and is forced and held in contact with the flange 23 of said screed 21 by the pressure of concrete passing through the discharge spout of the hopper.

Each of said screeds 21 and 22 is equipped at proper points between its ends with bearings 26 for shafts 27 with which links or connecting rods 28 are pivotally connected. Said links are also pivotally connected at their upper ends with shafts 29 disposed in vertically adjustable bearings 30. The latter are mounted in guides 32 carried by frame members and said bearings are suitably connected with adjusting screws 33 by means of which the position of the screeds 21 and 22 relatively to the level of the crowns of the side forms are suitably adjusted.

The bearings for the shafts 27 and 29 include metal sleeves or bushings 34 which are mounted in rubber or similar sleeves 35 snugly fitted into the said bearings 30 and 26, said rubber sleeves constituting shock absorbers of a well known type.

The shaft 18 is equipped with sets of diametrically opposed eccentrics 36 one of said sets of eccentrics being connected with the pitmen or connecting rods 37 and effecting reciprocation of the rear screed 22. The other set of said eccentrics is connected with the pitmen, or connecting rods 38 for effecting reciprocation of the screed 21. Said eccentrics have a throw radially of about $\frac{1}{16}$ of an inch so as to impart to the screed a reciprocating motion of approximately $\frac{1}{8}$ inch, it being obvious, of course, that this may be increased or diminished within certain limits without departing from the invention.

With reference to Fig. 1, it will be noted that the screeds are connected at two points, respectively, each with the eccentrics on the shaft 18. A larger number of points of connection may be adopted, if necessary, depending upon the length of said screeds 21 and 22 and upon other engineering factors.

In operation of the machine, suitable means are provided, of course, for maintaining the hopper filled with concrete, as, for example by disposing one or more concrete mixers in advance of and for travel in advance of said machine and which deliver concrete to said hopper. Provision may also be made to cause concrete delivered into the hopper to be spread uniformly to a substantially given level within the same by mechanisms and means for feeding concrete into the hopper and spreading the same, as aforesaid. Such mechanism being well known or readily designed by competent mechanics or engineers.

Reciprocation of the screed 21 causes material disposed between the same and the channel bar or screed 12 to be crowded yieldingly within said space. The short and rapid stroke of the screed 21 and the cooperative movements of the screed 12 causes the said material to be moved laterally relatively to that which is disposed above and below said last-named screeds. The crowding together of the aggregates of the mix will necessarily effect displacements of solid aggregates thereof relatively to each other and an appreciable grinding action in this portion of the mass to which is added the shocks imparted thereto incident to the rapid reciprocation of the screed 21.

The crowding together of this portion of the mass also causes the same to be bulged more or less vertically at every forward stroke of the screed 21. These bulging impacts tend to lift the mass that rests upon that material which is directly affected by the reciprocation of the screed 21 and to depress the portion of the mass previously deposited upon the grade. The coarser aggregates of the three portions of the mix, viz: the deposited portion underlying the discharge end of the hopper inclusive of the screeds 12 and 21, the portion disposed between said screeds and the portion above the level of the tops of said screeds, are interengaged to an appreciable degree so that the lateral reciprocation of the mass disposed directly within the zone of influence of the screeds will cause the interengaging coarse aggregates to be rocked and will also set up a grinding action between them.

Because of the density of the deposited portion of treated concrete mix, the aforesaid bulging of the reciprocating portion of the mass will be negligible downwardly and, therefore, will be directed more strongly upwardly so that the normally inert upper portion of the mass will be affected appreciably thereby and will cause a rapid settling of said portion.

The shocks and the crowding to which the mass disposed directly within the zone of action of the screeds 12 and 21 serves, in addition to the precedent settling last-above referred to, to effect complete elimination of air from the mix, causes the coarse and finer solid aggregates to become closely huddled together, breaks down the water globules of the mix to atomic fineness and thus promotes absorption thereof by the cement, effects a conversion of the water-cement content and the mortar forming solids of the mass into plastic mortar paste, effects uniform distribution of the mortar-paste through the mass, effects forced discharge of excess water to the surface of the mass, and prevents arching of the higher portions of the mass while causing settling of the same and thereby causes all of the lower portion of the mass of material down to the grade to be subjected constantly to the column-head pressure of the incident to the distance of the upper surface of the mass from the lower portions thereof.

Because of the composition of the mass, this column pressure acts similarly to hydrostatic head and aids materially to effect the desired results.

It will be apparent, of course, that the period of treatment of each of the progressive portions of the mix is determined by the speed of travel of the machine. That speed is rarely more than one inch per second.

The depth of the ultimate pavement slab is generally eight inches to eight and one-half inches. Preferably, the screeds 12 and 21 will be no less than twelve inches high.

Under the influence of the column head pressure and the other forces acting upon the mix, the latter will surge forward during deposit appreciably in advance of the web 11a of screed 12 and generally to a point forward of the front edge of the lower flange thereof. It is believed, therefore, that during travel of the machine, discharge of mix upon the pavement strip is practically uniform over the entire area bordered by the opposed walls of the screeds 12 and 21, but, in any event, at the rate of travel of one inch per second, every portion of the mass will be treated equally and amply to bring it into the desired condition immediately preceding deposit thereof.

The action of the screeds 21 and 22 on the deposited plastic material is distinctively different from that of the very slowly laterally reciprocating screeds of the finishing machines now in general use for the reason that the rapid short stroke imparted to these screeds causes the same to act with a hammerlike action on projecting coarse solids disposed in their paths to force them down into place as by turning them over from their original positions. The screed 22 is rarely opposed by any projecting solid of the mass because the screed 21 and the column head of concrete above referred to and also the fact that the forcing of coarse projecting solids into place will act to cause further surging forward of the mix in advance of the said projecting solids rather than an upward surge of material behind the screed 21. Such surging occurs only if the mix is too wet.

The screed 22 acts as a counter-balance for the screed 21 in that said screeds move always in opposite directions.

While the suspension of the screeds 12, 21 and 22 imparts to them a back and forth swinging movement, the short strokes thereof compared to the lengths of the several sets of suspension links makes movement of the screeds more nearly reciprocatory than rocking or swinging and, therefore, the screeds are described as being reciprocated.

Obviously, the screed 12 may be rigid instead of spring-held, as shown, and in that event the material disposed between the same and the reciprocating screed 21 will be subjected to a more positive crowding together. In that event the stroke of the screed 21 may be decreased in length if desired.

As shown in Fig. 7, wherein the channel bar 120 is rigid with the hopper and the screed 210 is reciprocable, a spring 211 disposed in a casing 212 which received telescopically the piston 213 of the eccentric rod 214, effects a cushioning of blows or impacts of the screed 210 against the material and thus permits the eccentric 215 of the drive shaft 216 to impart a longer stroke to the rod 214 than would be desirable otherwise, but the result would be practically the same as is accomplished by the mechanism of Fig. 2 as described above.

The mechanism illustrated in Fig. 6 which may be substituted for that shown in Fig. 2 comprises the opposed screeds 40 and 41, the drive-shaft 42, two sets of eccentrics 43 and 44, respectively, rigid with said shaft 42 and which are disposed, for example, so that the longest radial planes of the axis of the shaft 42 meeting the circumference of the respective eccentrics are disposed at right angles to each other, and two sets of connecting rods 45 and 46, the set of the latter by said eccentrics 43 being connected with the ends of the screed 40 and the other set of rods 46 connecting the eccentrics 44 with the screed 41.

Assuming the strokes imparted to the screeds 40 and 41 to be one-half inch each, then they would move relatively to each other a quarter of an inch. If the shaft 42 is rotated at a speed of 1800 R. P. M. the material subjected to the action of the screeds will be projected back and forth with a violence such as would cause the aggregates to become closely huddled and the cement mortar paste to be formed and properly distributed through the mass.

In Fig. 8 there is illustrated another device for effecting a violent shaking of concrete mix just prior to discharge or delivery from the bottom of a receptacle which consists of a bodily reciprocable chute 47 rigid with the screed 21 and which is provided with inclined front and rear walls. The side walls of the chute 47 are disposed outwardly of the side walls 48 of the discharge end portion of the hopper. The flexible aprons 49 suspended from the front and rear walls 50 of the discharge end portion of the hopper prevent escape of material through the gaps 51 between the front and rear walls of the chute 47 and the lower ends of the front and rear walls of the discharge spout.

Obviously, the angular relation of the front and rear walls of the chute 47 may be changed and varied. For example, one or both of said walls may be disposed vertically or both of said walls may diverge toward their lower ends instead of converging as shown.

Similarly, in the case of Figs. 2, 6 and 7, respectively, the opposed walls of the discharge end portion of the hopper, wherein the material is subjected to compression and other action as above described, may be disposed angularly to each other as will be readily apparent to those skilled in the art without further illustration.

It will be obvious, of course, that the bottom of the hopper of the machine of the present application, or of a conveyor bucket constituting the equivalent of the hopper of the machine, will be disposed above the surface of deposit of the concrete equal substantially to the depth of the layer of concrete which is to be deposited progressively upon a pavement strip or other surface and that, therefore, a column of material will extend from the upper level of the material in the hopper to the surface of deposit and that the treatment of concrete just prior to its discharge upon said surface occurs at a point or in an area between the top and base of said column and also that the treatment of the concrete mix to change its condition must be effected prior to its deposit.

The effect of the action of the treating mechanism between the ends of said column serves to maintain all of said column disposed above the zone of treatment to be maintained in motion so that it cannot arch and thus become lodged in the hopper.

In practice the hopper is maintained filled with concrete mix to an average predetermined level appreciably higher than the zone of treatment of the mix as it is progressively discharged and this superimposed material, plus that disposed within the zone of treatment constitutes a column head which exerts the substantial equivalent of hydrostatic pressure upon the portion of the column of concrete lying between the surface of deposit and the point of discharge from the receptacle and which acts to cause the deposited material to surge forward and underneath the front screed or channel bar 12 and sometimes beyond the front edge of the latter so that deposit of material is not effected at the very beginning of operations by dropping the mix from the receptacle onto the surface of deposit through an intervening air space, but takes place by causing a constant, more or less, rolling motion of the advanced portion of the concrete mix further material feeds from the receptacle.

Accordingly, the speed of travel of the receptacle over the surface of deposit determines the duration of progressive treatment of the flowing material and consequently the number of impacts to which it is subjected to convert it into the plastic mass which, when set, constitutes the ultimate finished product.

The screed 21, it will be noted, is of very appreciable width and because it passes over a dense mass of deposited concrete, prevents any upward surge of the still plastic mass rearwardly of said screed unless the water content of the mass is excessive, and in that event, the density of the deposited mass is decreased so that the second screed is enabled to reduce its level to correspond with the predetermined crown of a pavement strip.

In the case of concrete foundations and walls, etc., the surfacing of the concrete is required only upon completion of the structure, as for example at the top of the foundation wall and later at the top of a building wall, etc. and in instances such as these, it is common practice to add a layer of cement mortar to the somewhat rough surface that is left at the top of the mass following discharge from a conveyor bucket equipped with the treating mechanism of this invention.

In the respective structures of Figs. 2 and 7, the springs 10e and 211 are preferably of such strength as to overcome the normal column head pressure of the mass in the hopper disposed above the zone of direct action of the reciprocable members 21 and 210, respectively. Said springs are intended to function only as cushioning means to prevent undue stresses on the actuating mechanism connected with the last-mentioned members.

In the case of the structure of Fig. 8, the material disposed between the opposed walls 47 and 49 is projected back and forth with great rapidity and thus is subject to severe shocks which serves to effect the conversion of the unworkable mix into plastic workable concrete. These shocks serve particularly to throw the coarse aggregates alternately in opposite directions which causes them to become crowded and huddled together and to effect the formation and distribution of mortar through the mass.

The angular relation of the walls 47 and 49 tends also to increase the normal tendency of the reciprocated mass to bulge upwardly responsively to every impetus imparted to it and thus increases the force of tremors directed upwardly to the superimposed portion of the mix to accelerate settling of the latter and liberation of air and surplus moisture.

The invention also presents a novel method of converting unworkable concrete mix into a workable plastic mass by subjecting the mix to the repeated compressing action of a high-speed member acting similarly to a hammer to effect a gradual rearrangement of the coarser solids of the mass into closely huddled relation to each other and, at the same time, effecting a breaking down of water globules of the mass to cause the latter to be absorbed readily by the mortar forming constituents of the mix consisting of cement, sand dust and fine particles of other non-cementitious solids. This compression or crowding together of the coarser solids has the effect also of causing air to be displaced from the mass together with excess water and to eliminate from the mass the pockets of cement mortar that usually occur at intervals of the mix and thus to effect distribution of the mortar content into thin films of paste lying in relatively uniform courses between opposed faces of the non-cementitious aggregates similarly to the mortar distribution common to masonry.

Experience and tests have demonstrated that these results cannot be obtained otherwise than by subjecting the unworkable mix to a very violent action such as will force the coarse aggregates into desired relative positions in a relatively gradual manner by imparting thereto many hundreds or thousands of impacts, the large number thereof being particularly necessary to the conversion of the mortar forming constituents into mortar paste at the same time that said constituents are being distributed through the mass.

This result is not possible of attainment in the mix after the same has been deposited where it is intended to set, by any method known to me, that is commercially practicable from an economic stand-point.

In carrying out the present method of the invention the best results are obtained by maintaining an average level of mix in the receptacle above the zone of action of the mechanism of the machine, but this is not essential to the attainment of the desired result.

Naturally, the present method requires that the mix be subjected to the crowding and compressing action described hereinabove for an appreciable time interval which is dependent mainly upon the number of strokes of the reciprocable member of the mechanism employed and this period, in continuous operations as in pavement construction, is measured in seconds.

Thus, if the concrete mixer delivers one cubic yard of mix per second to the receptacle, the mechanism must be such as to speed of action, depth of the zone of treatment, and length of stroke, as to deliver one cubic yard per second upon the surface of deposit of the mix in its finished state, it being obvious, of course, that in the instance illustrated, the speed of travel of the receptacle constitutes another time control that must be synchronized more or less accurately with the other controlling factors set forth.

I claim as my invention:

1. Apparatus of the type specified comprising a receptacle open at its bottom, a traveling support for the same arranged to maintain the open bottom of the receptacle spaced from a surface upon which the contents of the receptacle are adapted to be deposited progressively, a pair of opposed spaced apart members disposed so that the contents of the receptacle must pass between the same in passing out of the bottom orifice of the receptacle, and mechanism for effecting relative rapid intermittent movements to said members to vary appreciably their normal spaced apart relation to each other and thereby impart compacting impacts progressively to the flowing material within a zone disposed between the top and bottom of the mass thereof said members being spaced from the said surface and determining substantially the depth of mix deposited thereupon, the mix last deposited constituting the said bottom portion of the mass.

2. The hereindescribed method of converting an unworkable concrete mix into a workable plastic mass which consists in disposing the mix in a receptacle, causing it to flow through and from said receptacle directly into setting position progressively and continuously at a relatively predetermined uniform rate and subjecting the mass progressively during said flow and prior to deposit thereof to repeated yielding compression impacts and mass movements of visibly appreciable length laterally of the direction of said flow of the mass with a frequency and force proportioned to the rate of flow sufficient to convert the mortar forming constituents of the mass into mortar paste and effect a relatively uniform distribution of said paste throughout the mass progressively during its said flow.

3. Apparatus of the type specified comprising a receptacle open at its bottom, a traveling support for the same arranged to maintain the open bottom of the receptacle spaced from a surface upon which the contents of the receptacle are adapted to be deposited progressively, a pair of opposed spaced apart members disposed so that the contents of the receptacle must pass between the same after passing out of the bottom orifice of the receptacle, springs engaged with one of said walls for maintaining the same yieldingly in a predetermined position relatively to the other of said walls, and mechanism connected with the other of said walls for imparting thereto rapid to and fro movements relatively to said spring-held wall, thereby to subject material disposed between said walls to compression impacts limited in force by said spring-held wall, said walls and mechanism cooperating to effect mass movements of material disposed therebetween laterally of the direction of flow of the same and relative to material disposed in the body of the receptacle.

4. Apparatus of the type specified comprising an open bottom receptacle for concrete mix, a chute disposed for passage of mix therethrough as it flows from the receptacle, said chute having a pair of opposed walls, mechanism for reciprocating one of said walls toward and from the other thereof at high frequency and through an appreciable length of stroke for subjecting the flowing mix progressively to compression impacts immediately preceding its deposit upon a surface disposed below and spaced from said chute, the other of said walls being spring held in a predetermined position and adapted to yield responsively to the pressure exerted against the same by the mix flowing through said chute as the same is subjected to said compression impacts.

5. Apparatus of the kind specified comprising a chute open at top and bottom and disposed for travel over a surface for deposit of concrete mix to a depth determined substantially by the space between the same and the bottom of said chute, the latter including a pair of opposed walls movable toward and from each other, mechanism for effecting said relative movement of said walls intermittently and rapidly and through an appreciable substantially predetermined stroke, the direction of said relative movement being lateral to the flow of mix through said chute, yielding means associated with one of said walls for substantially limiting the pressure exerted upon mix interposed between said walls during their relative movement toward each other, an open bottom receptacle for mix disposed immediately above said chute for effecting substantially continuous flow of mix through the latter at a rate determined by the rate of travel of said chute along said surface, and mechanism for effecting travel of said receptacle and chute along said surface.

6. Means for converting an unworkable concrete mass into a workable plastic mass which comprises an open bottomed receptacle adapted to be disposed appreciably above and moved over a surface for effecting substantially uniform progressive deposit of the mix into setting position upon said surface, and mechanism below the discharge end portion of the receptacle and interposed between the bottom of the receptacle and the predetermined top level of the laid concrete for subjecting the mix progressively and intermittently during flow and prior to discharge of the same upon said surface to compression impacts of high frequency and visibly appreciable stroke exerted laterally of the direction of flow of the mix from the receptacle, said mechanism being spaced from said surface and substantially controlling the depth of converted material deposited upon the same.

7. A machine of the type specified comprising a traveling carriage movable over a surface of deposit for concrete mix, a chute mounted on the carriage and disposed at an elevation above said surface, said chute including a pair of opposed walls converging toward each other at their lower ends and movable toward and from each other and bordering intake and discharge orifices for concrete mix, an open bottom receptacle for mix disposed above said chute for causing all mix discharged from said receptacle to pass between said walls, mechanism connected with one of said walls for imparting thereto a to and fro movement of appreciable length of stroke and at high frequency relatively to the other of said walls, thereby to subject mix disposed between said walls to a succession of compression impacts tending to bulge the same upwardly during flow of said mix through said chute, and yielding means associated with one of said walls for cushioning the said impacts and thereby substantially limiting the force thereof.

8. In a machine of the type specified, a hopper for concrete mix having an open bottom disposed at an elevation above the predetermined level of the ultimate pavement, a pair of opposed plates disposed to define a discharge chute lying between the hopper bottom and the said predetermined level of the ultimate pavement surface with their lower edges extending transversely of the pavement strip and substantially at the last-named level, and mechanism for imparting rapid reciprocatory movement of one of said plates toward and from each other thereof and relatively to the hopper, thereby to impart compression and condensing impulses to mix flowing from the hopper after leaving the latter and immediately prior to its deposit upon the pavement strip.

ALFRED W. FRENCH.